United States Patent [19]

Oslapas

[11] Patent Number: 5,060,620
[45] Date of Patent: Oct. 29, 1991

[54] MOTOR VEHICLE FUEL VAPOR EMISSION CONTROL ASSEMBLY

[75] Inventor: Algis G. Oslapas, Dearborn Heights, Mich.

[73] Assignee: Ford Motor Company, Dearborn, Mich.

[21] Appl. No.: 247,182

[22] Filed: Sep. 21, 1988

[51] Int. Cl.$^5$ .................. F02M 33/02; B62D 61/02
[52] U.S. Cl. .................. 123/519; 123/516; 180/225
[58] Field of Search .............. 123/520, 519, 518, 521, 123/516; 180/225

[56] References Cited

U.S. PATENT DOCUMENTS

| | | |
|---|---|---|
| Re. 26,169 | 3/1967 | Hall .................. 123/519 |
| 2,433,240 | 12/1947 | Schlage . |
| 2,473,388 | 6/1949 | Rambo . |
| 2,685,345 | 8/1954 | Lindner . |
| 2,702,089 | 2/1955 | Engelder . |
| 2,749,221 | 6/1956 | Gilmont et al. . |
| 3,018,841 | 1/1962 | Gerlich . |
| 3,353,339 | 11/1967 | Walter . |
| 3,457,917 | 7/1969 | Mercurio . |
| 3,683,597 | 8/1972 | Beveridge et al. . |
| 3,728,846 | 4/1973 | Nilsson . |
| 3,847,574 | 11/1974 | Fish . |
| 3,853,483 | 12/1974 | Cross, Jr. . |
| 3,854,911 | 12/1974 | Walker . |
| 4,058,380 | 11/1977 | King, II . |
| 4,203,401 | 5/1980 | Kingsley et al. . |
| 4,306,894 | 12/1981 | Fukami et al. . |
| 4,326,489 | 4/1982 | Heitert . |
| 4,381,583 | 5/1983 | von Tresenhausen . |
| 4,395,991 | 8/1983 | Miyachi .................. 123/519 |
| 4,454,849 | 6/1984 | Mizuno et al. . |
| 4,658,797 | 4/1987 | Brand . |
| 4,699,232 | 10/1987 | Nebu .................. 180/225 |
| 4,727,955 | 3/1988 | Honda .................. 123/519 |
| 4,766,822 | 8/1988 | Kato .................. 123/519 |
| 4,787,643 | 11/1988 | Shirata . |
| 4,793,839 | 12/1988 | Hayashida et al. . |
| 4,805,581 | 2/1989 | Yamada .................. 123/519 |
| 4,853,009 | 8/1989 | Turner .................. 123/519 |
| 4,877,001 | 10/1989 | Kinealy .................. 123/519 |

FOREIGN PATENT DOCUMENTS 067602 12/1982 European Pat. Off. .

Primary Examiner—Carl Stuart Miller
Attorney, Agent, or Firm—Charles H. Ellerbrock; Roger L. May

[57] ABSTRACT

A motor vehicle fuel vapor emission control assembly is disclosed to comprise fuel vapor emission control means and structural vehicle support means integral with the motor vehicle, the fuel vapor emission control means comprising: adsorption means for releasably adsorbing fuel vapors; a housing for containing the adsorption means, the housing being positioned within a hollow in a structural member, such as a frame rail, of the structural vehicle support means; and vapor communication means for communicating fuel vapor from a fuel tank or other fuel reservoir in the vehicle to the adsorption means in the housing and for communication fuel vapor from the housing to the vehicle engine.

22 Claims, 2 Drawing Sheets

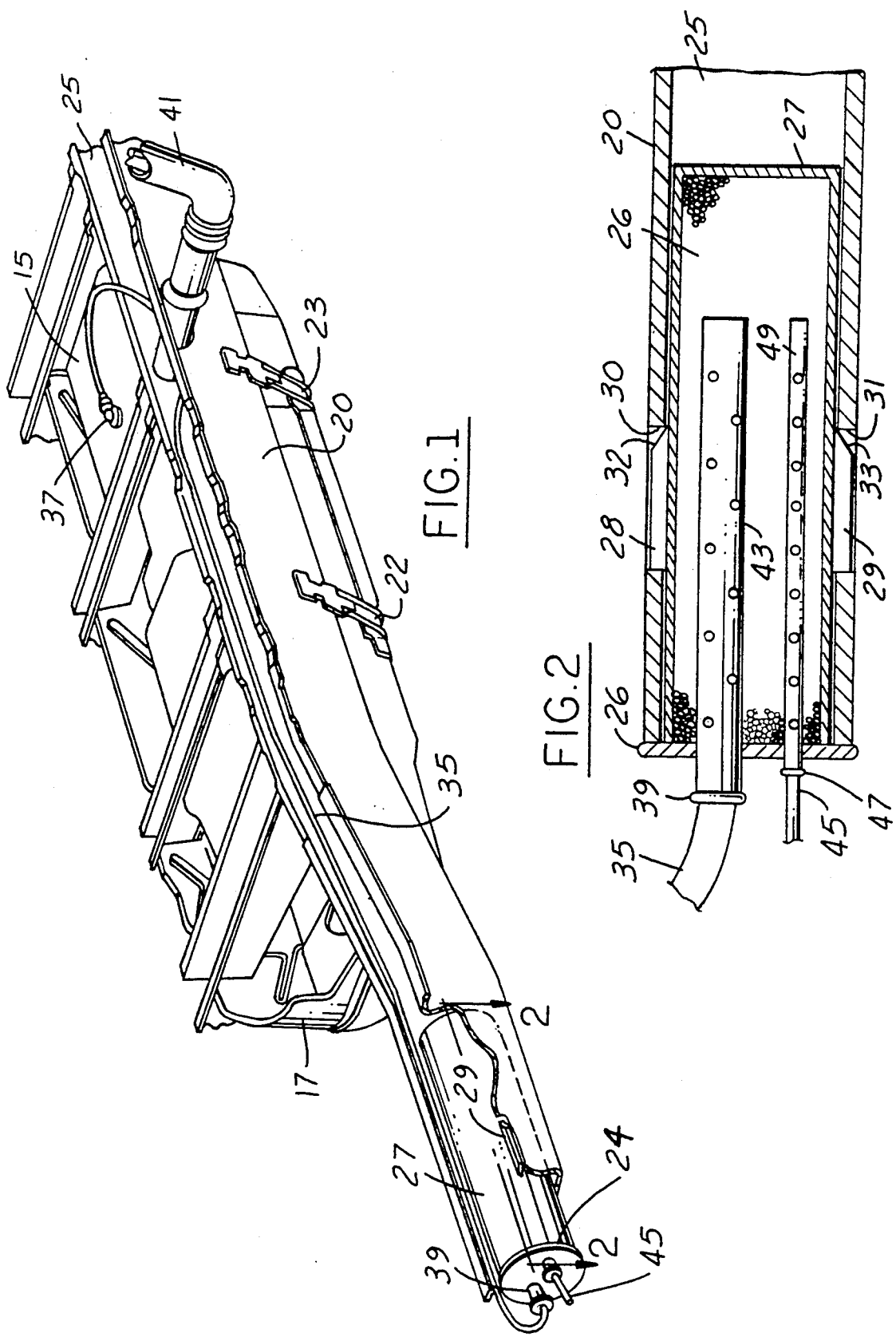

MOTOR VEHICLE FUEL VAPOR EMISSION CONTROL ASSEMBLY

INTRODUCTION

The present invention is directed to an assembly for controlling fuel vapor emissions from a motor vehicle, specifically, for capture and recovery of fuel vapors which otherwise would escape from a fuel tank of the motor vehicle into the atmosphere. More particularly, the invention is directed to a motor vehicle fuel vapor emission control assembly comprising fuel vapor emission control means within a structural support member of the motor vehicle, such as a frame rail or the like.

BACKGROUND OF THE INVENTION

Fuel vapor emission control canisters generally and their use in controlling emissions of fuel vapors from motor vehicles are well known to the skilled of the art. Carbon canister systems are known for storing fuel vapors emitted from an automotive-type fuel tank or carburetor float bowl or other similar fuel reservoir to prevent emissions into the atmosphere of such fuel vapors. These systems usually consist of a canister containing carbon or other medium which will releasably adsorb the fuel vapors. The canister would have an inlet from the fuel tank or other reservoir, the fuel vapors flowing either by gravity or under vapor pressure into the canister to be adsorbed by the filter medium therein and stored. The canister also would have a fresh air inlet and, further, a purge line connecting the canister to the carburetor or engine intake manifold. During operation of the engine, vacuum in the intake manifold draws fresh air through the canister to the engine, thereby desorbing the filter medium of the fuel vapors.

Typically, a fuel vapor emission control canister houses a bed of an adsorbent material, such as granulated charcoal or the like, often in conjunction with other filtering means. Exemplary of such technology is that taught in U.S. Pat. No. 4,568,797 to Brand; U.S. Pat. No. 4,454,849 to Mizuno et al; and U.S. Pat. No. 4,326,489 to Heitert.

The vapor adsorbing capacity of the adsorbent bed is limited, and typically, as noted above, a flow of atmospheric air is drawn by vacuum through the canister to the vehicle engine during the operation of the motor vehicle engine to at least partially rejuvenate the adsorptive medium. A large capacity adsorptive bed must nevertheless be provided to eliminate or at least reduce the amount of fuel vapors which are emitted to the atmosphere, e.g., when the vehicle remains unused for long periods or is used in an area of high ambient temperatures. The "packaging" of a large capacity fuel vapor emission control canister in a motor vehicle, that is, the positioning of one or more such canisters within a vehicle, presents a significant problem to vehicle manufactures, especially in view of the ever increasing importance of efficient use of vehicle space to accommodate vehicle down-sizing.

It is an object of the present invention to provide a motor vehicle fuel vapor emission control assembly wherein the adsorptive bed is packaged in the motor vehicle in a highly space efficient manner. This and other objects and advantages of the present invention will be apparent in view of the following disclosure.

SUMMARY OF THE INVENTION

According to the present invention, a motor vehicle fuel vapor emission control assembly comprises fuel vapor emission control means and structural vehicle support means integral with and providing structural support for the motor vehicle. The fuel vapor emission control means comprises:
  adsorption means for releasably adsorbing fuel vapor from a fuel reservoir of the vehicle;
  housing means for containing the adsorption means, the housing means being positioned within a hollow in a structural member of said structural vehicle support means; and
  vapor communication means for communicating said fuel vapor from said fuel reservoir to the adsorption means and for communication fuel vapors from the adsorption means to a fuel burning engine of the motor vehicle.

According to a method aspect of the invention, a motor vehicle fuel vapor emission control assembly as described above is mounted into a hollow in a structural vehicle support means, for example, into the open interior of a frame rail of the vehicle.

It will be appreciated by those skilled in the art in view of the present disclosure, that the invention provides a fuel vapor emission control assembly packaged in a motor vehicle with a high degree of space efficiency. The open space within the structural member wherein the canister housing is positioned would otherwise generally be substantially unused. Also, the structural vehicle support means, in a hollow of which the fuel vapor evaporative control means is positioned, is rugged by nature, and therefore, provides a degree of protection to the fuel vapor evaporative control means or at least to the housing means and other components thereof which are within such hollow. These and additional features and advantages of the present invention will be better understood from the following more detailed description of preferred embodiments.

DESCRIPTION OF THE DRAWINGS

FIG. 1 is a diagrammatic view of a motor vehicle fuel vapor emission control assembly according to the present invention.

FIG. 2 is an enlarged view of a portion of the assembly of FIG. 1, taken through section line 2-2 of FIG. 1. Specifically, FIG. 2 shows a housing means and absorption means contained therein positioned within a frame rail of the vehicle.

DETAILED DESCRIPTION OF PREFERRED EMBODIMENTS

Figure 3:
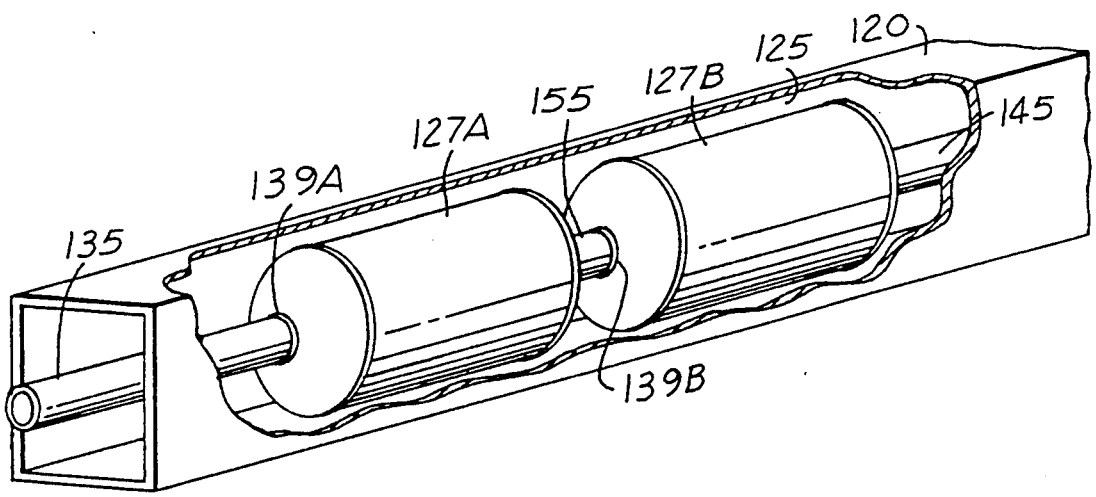
FIG. 3 is a perspective view, partially broken away, of components of a fuel vapor emission control means of the invention positioned within the open interior of a box-section frame rail of a vehicle structural support means.

Carbon canisters and the like containing fuel vapor adsorption material for emission control according to the present invention can be constructed according to a wide variety of designs known to the skilled of the art. Preferably the canister conforms to the size and generally to the configuration of the hollow of the structural member within which the canister is to be mounted, whereby a secure mounting can be achieved without squeaks or rattles due to vibrations of the motor vehicle while in use. The size of the canister will vary in accordance with the particular design requirements, choice of adsorbent material, and other factors known to the skilled of the art. In the typical current passenger car one or more canisters housing, in total, approximately three pounds of charcoal would be typical. Where more than one canister is used, they may be ganged either in series or in parallel, it being within the skill of the art to provide communication for vapor flow amongst the canisters. Motor vehicles currently in production, almost without exception, have structural support means comprising frame rails or subframe rails, crossmembers and the like providing, or which can be modified to provide, a hollow within which the housing or canister of the emission control means of the invention can be positioned. Even vehicles employing a so-called space frame typically have rails, often of circular crosssection. In this regard it should be understood that members of the structural support means of a vehicle suitable for the present invention include any having a sufficiently large and accessible open interior, for example, closed-section structural members such as box section and circular section rails and other structural member defining a hollow which is substantially completely laterally surrounded, and open-section structural members such as I-beams and C-sectioned rails and the like. In the case of an I-beam it will be apparent that two suitable hollows may be presented, one on either side of the central connecting plate of the I-beam.

Referring now to FIGS. 1 and 2, one preferred embodiment of the fuel vapor emission control assembly of the invention is seen to be associated with a motor vehicle fuel tank 15. The fuel tank is partially enclosed by shield 17 and is mounted to a frame rail 20 by means of straps 22 and 23. Frame rail 20 is part of the structural support means of the vehicle. It can be seen to be an essentially C-section rail defining hollow 25 along its entire length. Adsorption means 26 such as activated charcoal for controlling emissions of fuel vapors from the motor vehicle is contained within housing 27. Canister housing 27 can be seen to be positioned within hollow 25 of frame rail 20. For mounting the vapor emission control canister in the hollow frame rail the housing 27 provides radially extending flanges 28, 29 which are received in correspondingly positioned apertures 30, 31, respectively, provided in the frame rail 20. According to the preferred embodiment shown, flanges 28, 29 have a bevelled leading edge 32, 33, respectively. The canister housing 27 is loaded into the hollow 25 of frame rail 20 from left to right as pictured in FIGS. 1 and 2. It will be apparent in view of this disclosure that the housing 27 preferably is sufficiently deformable and resilient to allow flanges 28 and 29 to be compressed until they reach respective apertures 30, 31, at which point they enter the aperture to mount the housing. Advantageously, the housing then could be removed from hollow 25 of frame rail 20 by manually pressing flanges 28 and 29 radially inwardly to clear the apertures, followed by removal of the housing from the frame rail. End plate 24 of the canister housing abuts the end of the frame rail. It will be apparent, however, that the canister housing need not be positioned at an axial end of a frame rail, and according to alternative embodiments need not have such end plate. While the above described mounting means is preferred, numerous alternative suitable mounting means will be apparent to the skilled of the art in view of the present disclosure.

The fuel vapor emission control assembly of FIGS. 1 and 2 further comprises vapor communication means for communicating fuel vapor from the fuel tank to the canister housing 27. Specifically, hose 35 is seen to extend from hose attachment and valve assembly 37 to inlet port 39 of the canister housing. House attachment and valve assembly 37 may comprise simply an open connection to the interior of fuel tank 15 or, optionally, may provide a pressure actuated one way or two way valve, selection of which will be within the ability of those skilled of the art in view of the present disclosure. Hose 35 is seen to pass under fuel filler pipe 41 and to extend then within hollow 25 of frame rail 20 to the canister housing. Inlet port 39 of the canister housing is seen to comprise a perforated fuel vapor distribution pipe 43 extending longitudinally into the adsorbent material 26.

The vapor communication means of the fuel vapor emission control assembly of FIGS. 1 and 2 further comprises hose 45 extending from desorption port 47 of the canister housing 27 to a source of vacuum at the vehicle engine (not shown). Thus, for example, hose 45 may extend, with or without additional valving and connections, etc., to the air intake manifold of the vehicle engine. During operation of the engine, therefore, a vacuum is drawn through hose 45 causing air to be pulled through the canister housing to the engine to be burned along with any fuel vapors carried by the air. The air may be drawn into the housing canister either through hose 35 or, optionally, through an alternate source of atmospheric air (not shown). Hose 35 may either be closed from the canister housing to the fuel tank or, optionally, may have a T-connection or the like to a source of atmospheric air. In such case, the opening to the atmospheric air should be controlled by suitable valving such as a one-way valve to prevent escape of fuel vapors therethrough to the atmosphere. As noted above, the design and construction of all valving, hose connections and the like for the vapor communication means will be apparent and within the skill of the art in view of the present disclosure. Within the canister housing 27, the desorption port 47 comprises a perforated vapor purge 49 to facilitate more uniform air flow through the adsorption medium and, therefore, more thorough desorption of fuel vapors to better rejuvenate the fuel vapor capturing capacity of the assembly.

According to a particularly preferred embodiment within the scope of the invention as illustrated in FIGS. 1 and 2, canister housing 27 is substantially flexible and axially conformable to an axial curvature of hollow 25. The fuel vapor adsorbent material within the housing must, obviously, also be conformable to the changing configuration of the filter housing as it flexes. The flexibility of the canister housing may be required either because the final position of the canister housing within the frame rail hollow calls for curvature of the housing different from that which it has in its free state, or because the canister housing is to be loaded into a frame rail hollow (for example, axially loaded into the open interior of a closed-section frame rail) and must pass through a curved portion of the frame rail before reaching its final position.

Referring now to FIG. 3, an alternative embodiment of the invention is seen to comprise a pair of canister housings mounted in series within hollow 125 interior of a closed-section frame rail, specifically, a square section frame rail 120. Canister housings 127A and 127B are connected in series by hose 155. Hose 135 travels within the interior of frame rail 120 from a fuel reservoir of the motor vehicle, such as the fuel tank, to fuel vapor port 139A of canister housing 127A. Inside canister 127A is housed suitable vapor adsorption means and, preferably, vapor distribution means such as a perforated extension of hose 135, or the like. Air and any remaining vapors may exit canister 127 and be carried by hose 135 to port 139B of canister 127B, the interior of which typically would be the same as that of canister 127A. Hose 145 connects canisters 127A and 127B to a source of vacuum at the vehicle engine, whereby during engine operation fuel vapors may be desorbed from the adsorbent material inside canisters 127A and 127B and combusted in the engine.

As in the case of the embodiment of FIGS. 1 and 2, the fuel vapor emission control assembly of FIG. 3 may further comprise means for communication of atmospheric air through the canisters (and the adsorption means therein) to tube 145. In view of the series connection of canister housings 127A and 127B, such source of atmospheric air preferably communicates with hose 135 at a point mediate the fuel reservoir and canister 127A. A particular advantage of the series connection of the embodiment of FIG. 3 is the potential for axial flexibility presented by the connecting hose 155. Where, for example, the fuel vapor emission control assembly is to be mounted into a frame rail axially and the frame rail has a sharp and/or non-constant axial curvature, such flexibility may greatly facilitate the positioning of the assembly into the frame rail hollow. This will be particularly advantageous where it is difficult, inconvenient or expensive to construct a single larger canister housing having sufficient flexibility to negotiate the axial curvature of the frame rail during such assembly operation.

Figure 4:
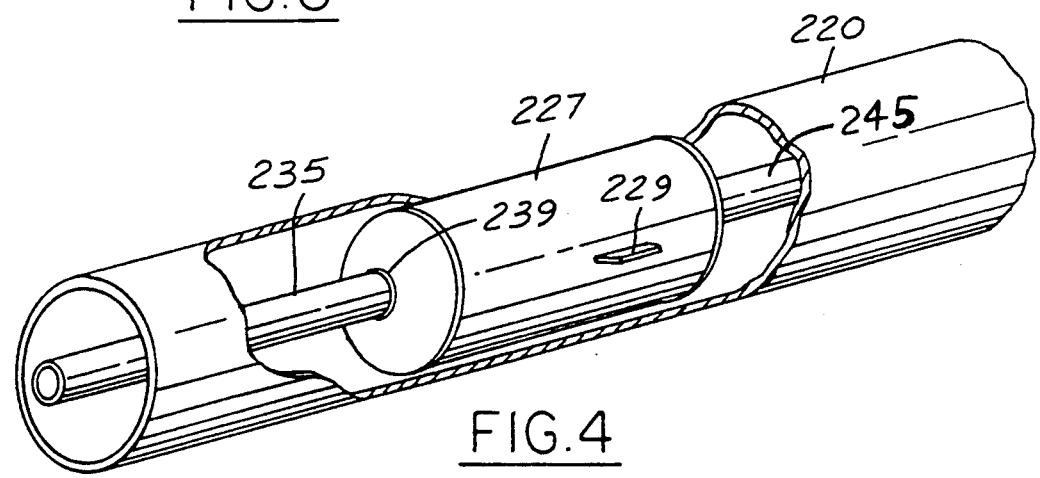
FIG. 4 is a perspective view, partially broken away, of another embodiment of the invention, wherein a canister housing of a fuel vapor emission control means is positioned within the open interior of a cylindrical frame rail of a structural vehicle support means.

Referring now to FIG. 4, an alternative embodiment of the invention is seen to comprise a cylindrical canister 227 mounted within the cylindrical open interior of frame rail 220. Cylindrical frame rail 220, like square section frame rail 120 in the embodiment of FIG. 3, has a closed-section hollow and, accordingly, the canister 227 must be assembled axially into the frame rail. Preferably, canister housing 227 provides a relatively close tolerance fit with the interior surface of frame rail 220 to minimize rattles, vibrations, etc. To secure the axial positioning of the canister a radially extending flange 228 (not shown) and, on the opposite side, radially extending flange 229 are received in correspondingly sized and positioned apertures (not shown) in the frame rail. As discussed above in connection with the embodiment of FIGS. 1 and 2, flanges 228 and 229 should be sufficiently compressible or displacable to allow assembly and disassembly of the canister housing 227 in the frame rail. Vapor communication means for communicating fuel vapor from the motor vehicle fuel tank or other fuel reservoir is seen to comprise hose 235 entering canister 227 at port 239 and exit hose 245 providing communication to the vehicle engine.

Figure 5:
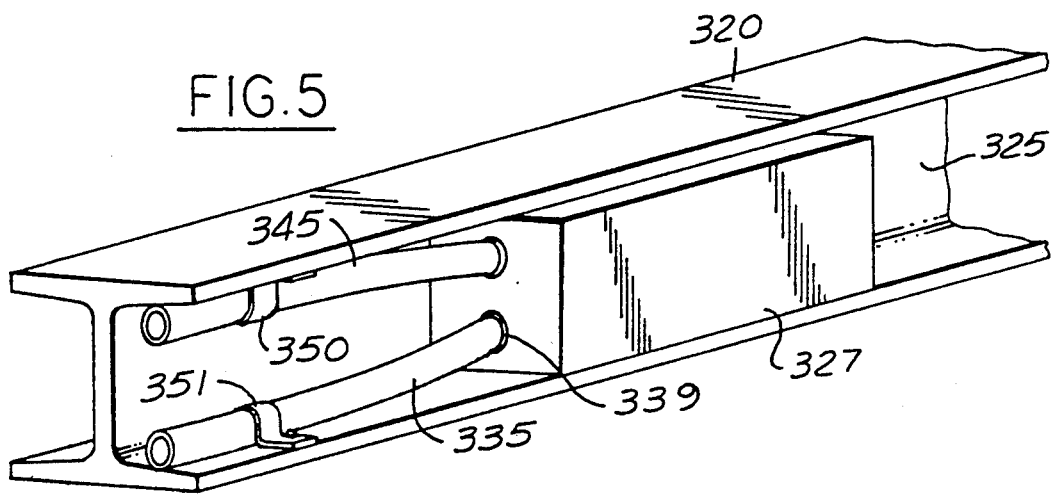
FIG. 5 is a perspective view, partially broken away, of another embodiment of the invention, wherein a canister housing of a fuel vapor emission control means is positioned within an I-beam section frame rail member of a structural vehicle support means.

Referring now to FIG. 5, yet another alternative embodiment of the invention comprises a substantially rectilinear canister housing containing fuel vapor adsorption means mounted in the open-section hollow of an I-beam frame rail. Thus, canister housing 327 is mounted within hollow 325 on one side of I-beam frame rail 320. Vapor communication hose 335 carries fuel vapors from a fuel reservoir to the fuel vapor adsorption means within canister housing 327, entering the canister housing at port 339. Vapor communication hose 345 communicates to the vehicle engine in the manner described above for other embodiments of the invention. The canister housing 327 may be mounted within hollow 325 by means of a friction fit with the adjacent surfaces of the I-beam in combination with the stabilizing effect of the vapor communication hoses 335, 345 being secured to the I-beam proximate the canister housing by means of clips 350 and 351. Numerous alternatives suitable mounting means will be apparent to the skilled of the art in view of the present disclosure.

The design, manufacture and assembly of all components of the fuel vapor emission control assembly of the invention is within the ability of those skilled in the art with the aid of the present disclosure. Numerous suitable manufacturing techniques and materials are commercially available. The canister housing, for example, is preferably a molded plastic container, such as an injection molded plastic container. The aforesaid optional mounting flanges can be formed during an injection molding operation to be unitary with the main body of the housing.

While the invention has been shown and described in accordance with certain preferred embodiments, it will be apparent to those skilled in the arts to which it pertains that various changes and modifications may be made thereto without departing from the scope of the invention as defined in the appended claims.

I claim:

1. A motor vehicle fuel vapor emission control assembly comprising fuel vapor emission control means and structural vehicle support means integral with said motor vehicle for providing structural support for said motor vehicle, said fuel vapor emission control means being for controlling emissions of fuel vapor from said motor vehicle and comprising:
   adsorption means for releasably adsorbing fuel vapors from a fuel reservoir of said vehicle;
   housing means for containing such adsorption means, said housing means being positioned within a hollow in a structural member of said structural vehicle support means; and
   vapor communication means for communicating fuel vapor from said reservoir to said adsorption means within said housing means and for communicating fuel vapor from within said housing means to a fuel burning engine of said vehicle.

2. The fuel vapor emission control assembly of claim 1, wherein said structural member of said structural vehicle support means comprises a frame rail of said motor vehicle and said hollow is an open interior of said frame rail.

3. The fuel vapor emission control assembly of claim 1, wherein said frame rail has a U-shaped crosssectional configuration.

4. The fuel vapor emission control assembly of claim 1, wherein said open interior has a square crosssectional configuration.

5. The fuel vapor emission control assembly of claim 1, wherein said open interior has a round crosssectional configuration.

6. The fuel vapor emission control assembly of claim 1, wherein said frame rail has a I-shaped crosssectional configuration.

7. A motor vehicle fuel vapor emission control assembly comprising fuel vapor emission control means, an engine and a .fuel tank mounted in said motor vehicle and structural vehicle support means integral with said motor vehicle for providing structural support for components of said motor vehicle, said fuel vapor emission control means comprising:
 adsorption means for releasably adsorbing fuel vapors from said fuel tank;
 housing means for containing said adsorption means, said housing means being positioned within a hollow of a structural member of said structural vehicle support means;
 vapor communication means for communicating fuel vapor from within said fuel tank to said adsorption means within said housing means and for communicating fuel vapor from within said housing means to said engine; and
 attachment means for fixing the position of said housing means within said hollow of said structural vehicle support means.

8. The motor vehicle fuel vapor emission control assembly of claim 7, wherein said structural member of said vehicle support means comprises an elongate frame rail having an elongate open interior and said hollow comprises a portion of said open interior.

9. The motor motor vehicle fuel vapor emission control assembly of claim 8, wherein said frame rail has a box section configuration and said fuel vapor emission control means is laterally surrounded by said frame rail.

10. The motor motor vehicle fuel vapor emission control assembly of claim 8, wherein said frame rail has an I-beam configuration and three elongate sides of said housing means abut, one each, three corresponding inside surfaces of said frame rail.

11. The motor motor vehicle fuel vapor emission control assembly of claim 8, wherein said frame rail is of tubular configuration, said open interior thereof being of substantially round cross-section, and wherein said housing means is of substantially round crosssection, having an outside diameter approximately equal to the inside diameter of said frame rail, said fuel vapor emission control means being laterally surrounded by said frame rail.

12. The motor vehicle fuel vapor emission control assembly of claim 8, wherein said housing means is elongate and sufficiently flexible to pass through an axially curved portion of said frame rail.

13. The motor vehicle fuel vapor emission control assembly of claim 7, wherein said attachment means comprises projections integral with and extending radially outward from said housing means, said projections being received in apertures in said structural member of said structural vehicle support means.

14. The motor motor vehicle fuel vapor emission control assembly of claim 7, wherein said vapor communication means is further for communicating fuel vapors from said engine to said adsorption means within said housing means of said fuel vapor emission control means.

15. A motor vehicle fuel vapor emission control assembly comprising a vapor emission control canister, an engine, a fuel tank and a structural vehicle support member, which vapor emission control canister comprises:
 a flexible filter housing positioned in and axially conformable to the axial curvature of an elongate hollow in said support member;
 a fuel vapor adsorbent material within and conformable to the configuration of said filter housing;
 a fuel vapor communication means for communicating fuel vapor from said fuel tank into said filter housing and for communicating fuel vapor from within said filter housing to said engine; and
 attachment means for fixing the position of said filter housing within said elongate hollow in said structural vehicle support means.

16. The motor vehicle fuel vapor emission control assembly of claim 15, wherein said adsorbent material comprises granulated activated charcoal.

17. The motor vehicle fuel vapor emission control assembly of claim 15, wherein said filter housing is a molded plastic container.

18. The motor vehicle fuel vapor emission control assembly of claim 17, wherein said attachment means comprises projections which are unitary with and which extend radially outward from the outer surface of said container.

19. A method of assembling a motor vehicle fuel vapor emission control means in a motor vehicle comprising an engine and a fuel tank mounted to structural vehicle support means of said motor vehicle, said fuel vapor emission control means comprising:
 adsorption means for releasably adsorbing fuel vapors;
 housing means for containing said adsorption means, said housing means being positioned within a hollow in said structural vehicle support means;
 vapor communication means for communicating fuel vapor from within said fuel tank to said adsorption means within said housing means and for communicating fuel vapor from within said housing means to said engine; and
 attachment means for fixing the position of said housing means within said hollow in said structural vehicle support means;
wherein said method comprises axially inserting said fuel vapor emission control means into said hollow.

20. The method of claim 19, wherein said structural vehicle support means comprises an elongate frame rail having an open interior and said mounting comprises inserting said housing means into an open end of said frame rail and moving it a distance longitudinally within said open interior of said frame rail.

21. The method of claim 20 wherein said housing means is flexible, has a substantially straight longitudinal axis in the free state, and conforms to different curvilinear configurations of said open interior of said frame rail while being moved said distance longitudinally within said open interior.

22. The method of claim 19 wherein the crosssection of said housing means substantially matches that of said open interior of said frame rail.

* * * * *